March 11, 1930.  T. W. CULMER ET AL  1,749,802
METERING VALVE
Filed Feb. 1, 1929   2 Sheets-Sheet 2

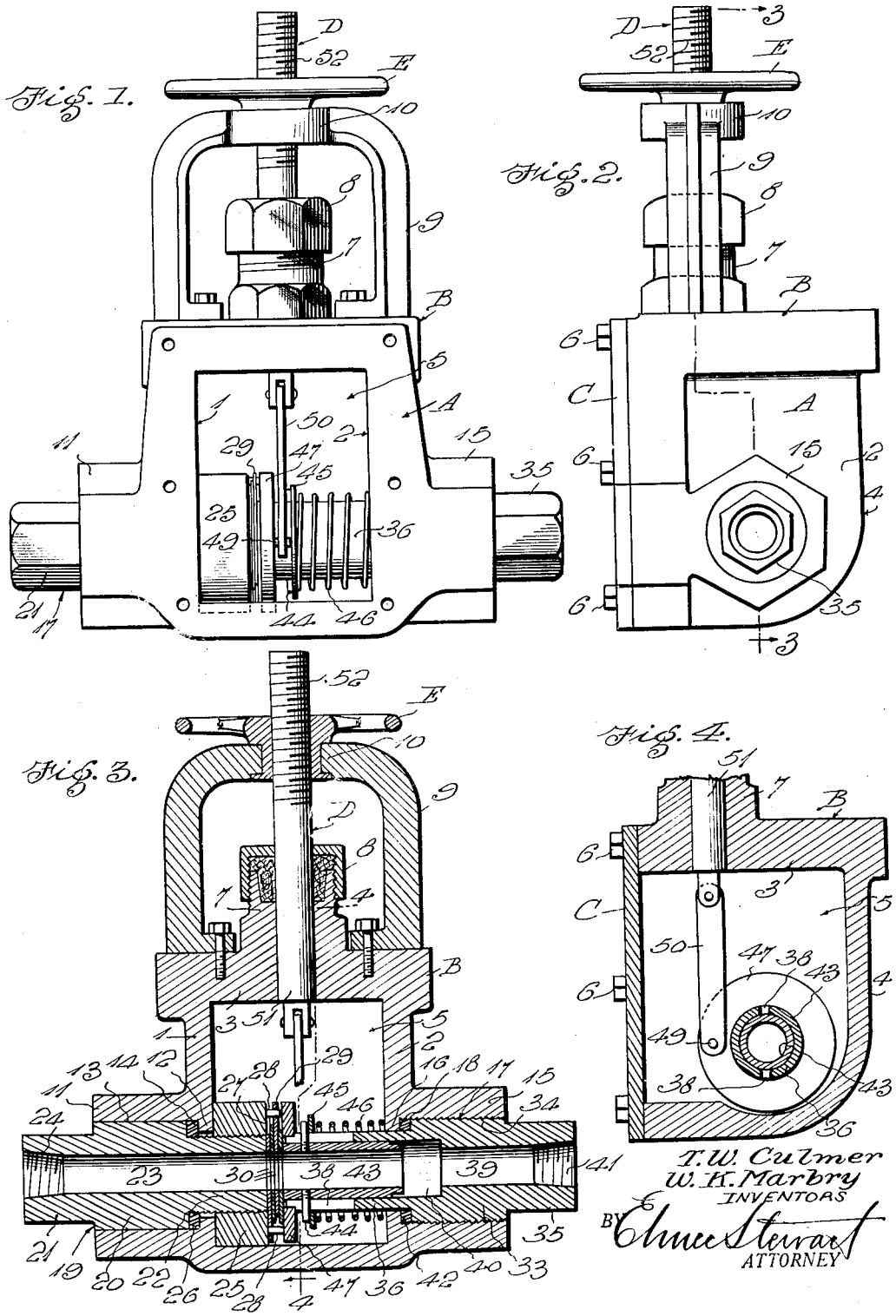

T. W. Culmer
W. K. Marbry
INVENTORS

BY Elmer Stewart
ATTORNEY

Patented Mar. 11, 1930

1,749,802

UNITED STATES PATENT OFFICE

THADDEUS W. CULMER AND WILLIAM K. MARBEY, OF ROBINSON, ILLINOIS

METERING VALVE

Application filed February 1, 1929. Serial No. 336,804.

The invention here described and illustrated relates to improvements in valves which are broadly of the gate type and in which it is desired to control the flow of material with great accuracy. In using such valves for metering purposes the regulation is mainly dependent upon the flow characteristics of the fluid and where liquids are involved slight changes in the pressure differential and the resistance offered by the valve itself have marked effect upon the accuracy of the valve. We have discovered that greater efficiency in metering can be obtained by an improved arrangement of valve leaves operating as an iris diaphragm.

A further object of the invention is to prevent such a valve from leaking under the ordinary operating conditions.

A further object of our invention is to provide simple and effective mechanism for simultaneously adjusting the valve leaves.

Other objects of our invention will be apparent from the following description of our preferred form of the invention as illustrated by way of example in the accompanying drawings, in which, Figure 1 is a side elevation with the cover plate removed;

Fig. 2 is an end elevation;

Fig. 3 is a vertical longitudinal section taken on the line 3—3 of Fig. 2;

Fig. 4 is a vertical transverse section on the line 4—4 of Fig. 3;

Figure 5:
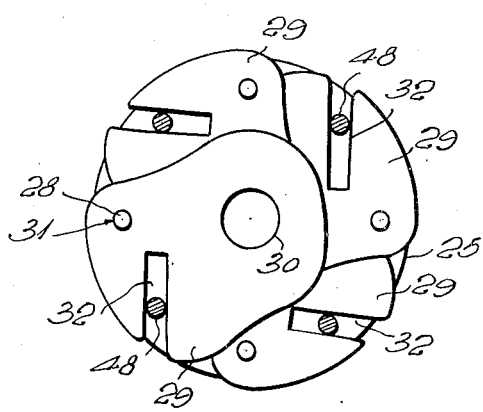
Fig. 5 is an enlarged detail in end elevation of the series of valve leaves forming an iris diaphragm.

As illustrated in these drawings, the invention consists essentially in a valve casing having inlet and outlet ports with an adjustable iris diaphragm mounted on the latter. This diaphragm is held in position and controlled against leakage by means which form a continuation of the inlet port and maintain the individual leaves of the diaphragm in close contact each with the others but without interfering with the ready adjustment of the diaphragm. The adjusting means is carried independently of the leak preventing means and thus is free from tension existing in the latter.

As shown in the drawings our improved valve comprises a casing or body A to the opposite ends of which are attached the connections for the inlet and the outlet. A bonnet portion B forms the upper part of the casing A. The front wall of the casing has a cover plate C, while a valve operating stem D extends vertically through the bonnet B and is controlled in turn by the hand wheel E.

The casing A has opposite end walls 1 and 2, to which the inlet and outlet are attached. A top 3 is formed to provide in conjunction with the back 4 and the cover plate C, a chamber 5 which extends upwardly into the bonnet B. The cover plate C is removably held in place on the casing A and the bonnet B by means of bolts 6 or other suitable fastening means.

On the bonnet portion B there is a boss 7 having a bore therethrough to accommodate the sliding stem D. A stuffing box 8 is fitted on the boss 7 to prevent leakage. A yoke 9 is bolted or otherwise mounted on the bonnet B and has a thrust bearing 10 at its upper portion in alignment with the bore in the boss 7. By this means the valve operating stem may be adjusted.

The end 1 of the casing A has an extension 11 through which there is a bore 12. This bore is enlarged as shown at 13 and extends inward toward the chamber 5 from which it is separated by a reduced shoulder 14.

The opposite end wall 2 of the casing A has a similar extension 15. This has an internally screw threaded bore 16 extending therethrough to within a short distance of the inner wall of the casing. This forms an enlarged portion 17. A reduced shoulder 18 separates the enlarged portion 17 from the chamber 5.

Mounted in the extension 11 is a bushing or thimble 19 upon which the operative parts of the valve diaphragm are mounted. This bushing has a central cylindrical portion 20 closely fitting in the enlarged portion 13 of extension 11. The bushing 19 extends beyond the member 11 to form a tool engaging portion 21 having a threaded bore. The opposite end of the bushing 19 is a screw threaded extension 22 extending past the shoulder 14 and into the chamber 5. The outer end 21 is screw threaded as shown at 24.

The inner extension is connected to the central bore 23 of the member 19 and carries on its outer periphery a ring 25 by which the member 19 is drawn tightly into the casing to compress the packing 26 against the shoulder 14. The ring 25 has a smooth plane face on its inner surface 27 which forms a valve seat and which carries a series of pivot studs 28, uniformly spaced about the center of the ring and projecting sufficiently from its surface to form bearings or pivots for one of the series of valve leaves.

Figure 6:
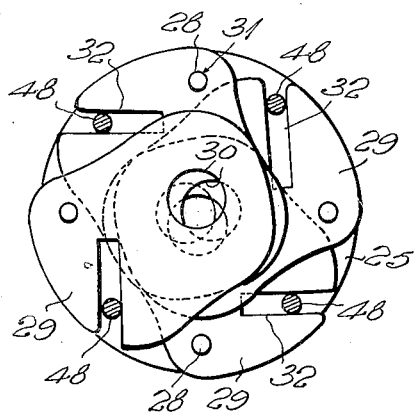
Fig. 6 is a similar view with the valve in mid-position.
Figure 7:
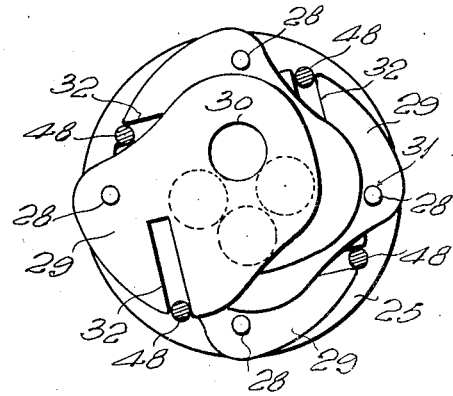
Fig. 7 is a similar view showing the valve in closed position.

These valve leaves, 29, are adapted to oscillate upon the studs 28 and constitute the actual fluid controlling elements of the valve as is shown in detail in Figs. 5, 6 and 7.

A leaf 29 is pivoted on each pin 28 and these leaves take the form shown in Fig. 5. Each leaf is apertured as at 30 to form an opening preferably of the same diameter as the bore 23 although for purposes of varying the control of flow, this opening may be larger or smaller as circumstances demand. The leaf 29 is provided near its outer edge with an opening 31 of appropriate size to receive a stud 28 about which the leaf is to oscillate. A slot 32 runs inwardly from the outer edge of the leaf and forms a channel or part of a cam by which the leaf is moved into adjusted position and held in such adjusted position.

Figure 8:
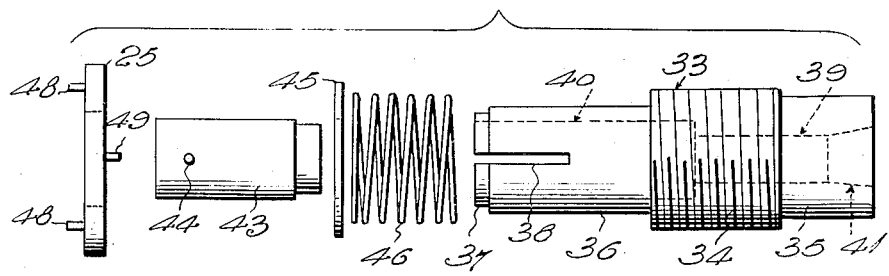
Fig. 8 is an expanded side elevation of the tension device.

The several leaves 29 are held in close or compacted relation against the valve seat 27 by means operating from the opposite wall of the chamber 5. This means, in the form shown, is an adjunct of the thimble or bushing 33 shown in detail in Fig. 8. This bushing has a threaded central portion 34 by means of which it is held within the extension 15, its outer end 35 projecting beyond the bushing 15 to receive a tool by which the element may be threaded into the extension 15. The opposite end of the thimble 33 forms a sleeve 36 of reduced diameter and terminating in a small bearing flange 37. Opposite slots 38 extend longitudinally of the sleeve 36 as shown in Fig. 8. The thimble 33 has a central bore 39 terminating inwardly at the enlargement 40 while it is screw threaded at its outer end as shown at 41 to receive a suitable inlet pipe. A gasket or other packing 42 fits between the shoulder of the portion 34 and the member 16.

The extension 36 of the member 33 approaches to within a short distance of the outermost valve leaf 29 and will prevent them from falling off of the studs 28. The pressure of the fluid and in particular any liquids which may be passing between the inlet and the outlet will serve to maintain the leaves in close contact and substantially leak proof when the latter are in the closed positions as indicated in Fig. 7.

It is found however that under certain circumstances it is desirable to insure the close contact between the individual leaves of the diaphragm and for this purpose additional means are provided for holding them together. This has the added advantage of compensating for any small variations in proportion of the parts in manufacture or assembly. To carry out this purpose we provide a sleeve 43 having an internal bore equal to that of the passageway 23 and 39. This sleeve 43 is slidably carried in the enlargement 40. Two diagrammatically opposite pins or lugs 44 extend outwardly from the sides of the sleeves and pass through the slots 38, 38 in the member 36. A ring 45 is loosely mounted outwardly of the extension 36 and rests against the pins 44, 44 as shown in Fig. 3. A spiral spring 46 is compressed between the wall of the chamber 5 and the ring 45. In this way the spring 46 being constantly under compression, urges the ring 45 and indirectly the sleeve 43 against the iris diaphragm.

The leaves of the iris diaphragm are caused to operate and thus vary the effective size of the opening between the sleeve 43 and the bore 23. To accomplish this result a ring 47 is rotatably mounted upon the reduced bearing flange 37. A series of pins 48 equal in number to the leaves, is provided on the inner face of the ring 47 and suitably spaced so that one pin 48 will move in each slot 32 of the leaves. On the opposite side of the ring 47 and as shown in Fig. 4 there is provided a stud 49 which receives a connecting rod 50. The opposite end of the connecting rod 50 is pivotally held by the lower end of the rising stem 51 which forms part of the stem D. The upper end of the stem 51 is screw-threaded as at 52 to pass through the hand wheel E.

In operation the valve is assembled through the cover plate C, the sleeve 43 being sufficiently retracted in the opening 40 to permit the insertion of the individual leaves 29. The latter are connected to the pins on the ring 47 and adjustment is accomplished by the partial rotation of ring 47. Ring 47 will respond to the vertical movement of the stem 51 which latter by reason of its linkage is prevented from rotating with the hand wheel E.

It will be apparent that the ring 47 rests on the journal 37 and is not affected by the movement of the spring 46 or the pressure within the casing.

We have illustrated the successive leaves of the iris diaphragm as being assembled in the usual order around the axis but this order may be varied and opposite leaves be brought into contact thus rendering the adjustment of the orifice more rapid. Figure 5 illustrates the wide open position of the valve with all of the apertures 30 in registration with the bore 23. Partial rotation of the ring 47 will cause the pins 48 to travel counter-clockwise as shown in Fig. 6 and thus partially restrict the opening through the apertures 30. Continued rotation of the ring 47 will bring the leaves 29 into the positions shown in Fig. 7 in which the apertures 30 occupy positions opposite the adjacent leaves and thus completely close the bore 23.

Under ordinary circumstances the pressure of the incoming fluid or liquid will serve to keep the leaves in leak proof contact when the valve is in the closed position.

However this condition is assured by providing the slidable sleeve 43 which while permitting the oscillation of the leaves in the iris diaphragm will nevertheless hold them in close contact when adjusted and assist the force of the incoming fluid to prevent leakage through the valve in case the latter is closed.

The above description is of our preferred form of the invention but numerous changes may be made within the scope of the invention as provided in the following claims.

We claim:

1. In combination, a casing, a fluid inlet, an outlet, an iris diaphragm mounted on said outlet, means for adjusting the diaphragm, a sleeve, and means for resiliently holding the sleeve against the diaphragm.

2. In combination, a casing, a fluid inlet, an outlet, an iris diaphragm mounted on said outlet, means for adjusting the diaphragm, a sleeve carried by the inlet and means for resiliently holding the sleeve against the diaphragm.

3. In combination, a casing, a fluid inlet, an outlet, an iris diaphragm mounted on said outlet, means for adjusting the diaphragm, and a sleeve slidably carried by the inlet and a spring forcing the sleeve into contact with the diaphragm.

4. In combination, a casing, a fluid inlet, an outlet, an iris diaphragm mounted on said outlet, a tubular member movably extending to the iris from the inlet, a ring carried thereon and operatively connected to the iris diaphragm.

5. In combination, a casing, a fluid inlet, an outlet, a series of leaves pivoted to said outlet, a tubular member movably extending to the iris from the inlet, a ring carried thereon and operating means connecting the leaves with the ring.

6. In combination, a casing, a fluid inlet, an outlet, a series of leaves pivoted to said outlet, a tubular extension for the inlet, a ring rotatably carried thereon, means connecting the leaves with the ring, a sleeve slidable within the extension and means for resiliently holding the sleeve against the leaves.

7. In combination, a casing, a fluid inlet, an outlet, including a valve seat, an iris diaphragm mounted on said valve seat, a tubular extension for the inlet, a ring carried thereon, operating means connecting the diaphragm with the ring, a sleeve slidable within the extension and means for resiliently holding the sleeve against the diaphragm.

8. In combination, a casing, a fluid inlet, an outlet, an iris diaphragm mounted on said outlet, operating means for the diaphragm, a slotted tubular extension for the inlet, a sleeve slidable within the extension, pins on said sleeve passing through the slotted tubular extension and a spring acting on the pins for holding the sleeve against the diaphragm.

In testimony whereof, we affix our signatures.

THADDEUS W. CULMER.
WILLIAM K. MARBRY.